United States Patent [19]

Potucek

[11] Patent Number: 4,815,910

[45] Date of Patent: Mar. 28, 1989

[54] COLLATED NAIL STRIP

[75] Inventor: Frank R. Potucek, Palmetto, Fla.

[73] Assignee: Star Fasteners International, Inc., Midway, Ga.

[21] Appl. No.: 159,148

[22] Filed: Feb. 23, 1988

Related U.S. Application Data

[63] Continuation-in-part of Ser. No. 12,099, Feb. 6, 1987, abandoned.

[51] Int. Cl.$^4$ .............................. F16B 15/08
[52] U.S. Cl. ......................... 411/444; 411/443; 411/446; 411/452; 206/343
[58] Field of Search ............... 411/442, 443, 444, 446, 411/451, 452, 486, 487, 488, 923; 206/343

[56] References Cited

U.S. PATENT DOCUMENTS

| 257,351 | 5/1882 | Lubin | 411/923 X |
| 895,080 | 8/1908 | Eisenreich | 411/452 |
| 1,360,344 | 11/1920 | Wood et al. | 411/452 |
| 2,940,081 | 6/1960 | Julifs | 206/343 |
| 3,481,459 | 12/1969 | Becht | 411/923 X |
| 3,835,991 | 9/1974 | Brecht | 411/442 X |
| 3,861,526 | 1/1975 | Leistner | 411/923 X |
| 3,935,945 | 2/1976 | Smith et al. | 411/923 X |
| 4,002,098 | 1/1977 | Colechia | 206/343 X |
| 4,637,768 | 1/1987 | Rabe | 411/487 |
| 4,653,242 | 3/1987 | Ezard | 52/727 |

FOREIGN PATENT DOCUMENTS 56684 10/1932 Switzerland ............ 411/451

Primary Examiner—Gary L. Smith
Assistant Examiner—Curtis B. Brueske
Attorney, Agent, or Firm—Joseph C. Mason, Jr.

[57] ABSTRACT

A plurality of fasteners each having an enlarged head with a slot or a passageway there through to accommodate and cage the shank of another like fastener so that the plurality of fasteners form a self-contained collated strip. Preferably the fastener has at least three spaced vertical cups and edges about a central core with a pair of adjacent edges of one fastener caged in the complimentary slot of the adjacent-like fastener. A notch is provided on such pair of edges to releasably lock the fasteners together in the strip.

39 Claims, 4 Drawing Sheets

//4,815,910

COLLATED NAIL STRIP

CROSS-REFERENCE TO RELATED APPLICATIONS

The fasteners used with this invention relate to prior fasteners shown in co-pending U.S. application Ser. No. 001,693, filed on Jan. 9, 1987. This application is a continuation in part of my co-pending application Ser. No. 012,099 filed on Feb. 6, 1987, now abandoned.

BACKGROUND OF THE INVENTION

1. Field of the Invention

This invention relates to fasteners. More particularly, it refers to fasteners usable in a collated strip for hammer tools.

2. Description of the Prior Art

There are many types of collated fasteners in use including the common and finishing smooth shank nails and the ring shank nail for increased holding power beyond that of a common round nail. Such fasteners require some tape or wire to interconnect the nails into a collated strip. None of such fasteners is self-interconnecting or locking to form a collated strip of self-contained fasteners. Many of the fasteners of the prior art are furthermore wasteful, being fabricated from an excess of steel, aluminum or other metals, such excess being of increasing importance as a competitive consideration.

SUMMARY OF THE INVENTION

The collated fasteners in accord with this invention overcome many of the aforementioned problems of the prior art as will be readily understood by consideration of the entire specification, drawings and claims herein.

My collated fasteners are a plurality of fasteners having an elongated shank and an enlarged flattened head integral with one end of the shank. The shank in the preferred fastener has a central core with ten spaced side walls radially extending from the core, the walls conforming substantially in length with the length of the shank and forming at least a five-pointed star in cross section. The head has a slot with an entrance at the rim of the head which rides on a converging pair of side walls forming a star point in an adjacent fastener. One converging pair of sidewalls has a notch adjacent the head for slidable engagement with the slot in the head of the adjacent fastener. A blow to the head of one fastener causes disengagement from the notch and movement of the fastener along the length of the converging sidewalls of the adjacent fastener.

It is the primary object of this invention to provide collated fasteners having a self-interconnecting feature so that the banding arrangements of the prior art will no longer be needed.

Another object is to provide a self-interconnecting collated nail that has utility in connection with common round shank nails and with several generations of advanced nails as well.

The invention accordingly comprises the features of a construction, combination of elements and arrangement of parts that will be exemplified in the construction hereinafter set forth and the scope of the invention will be indicated in the claims.

BRIEF DESCRIPTION OF THE DRAWINGS

The invention as to its organization and method of operation may be best understood by those having ordinary skill in the art by reference to the following description taken in connection with the accompanying drawings, in which.

Similar reference numerals refer to similar parts throughout the several views of the drawings.

DESCRIPTION OF THE PREFERRED EMBODIMENT

Figure 1:
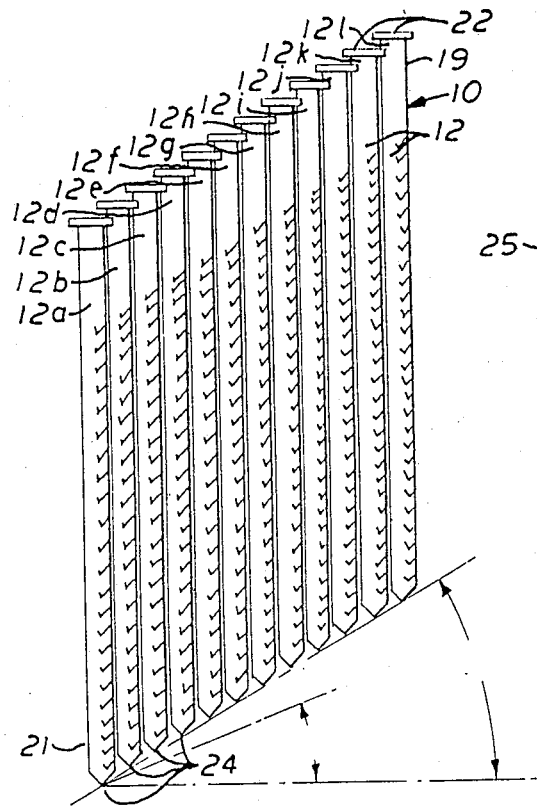
FIG. 1 is an isometric view of a collated strip of fasteners in the form of nails.
Figure 7:
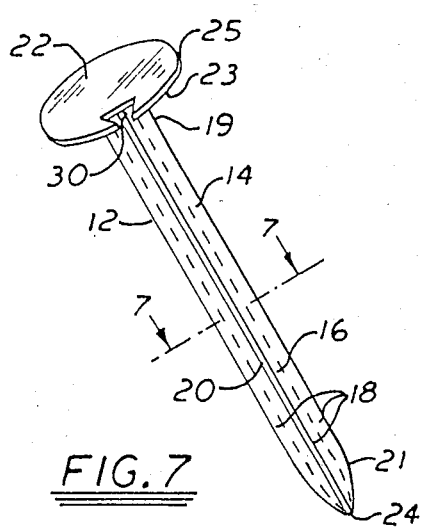
FIG. 7 is an isometric view of a single collatable fastener in the form of a star shaped nail.
Figure 21:
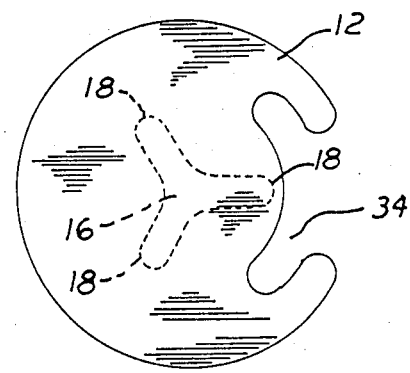
FIG. 21 is a plan view of the fastener of FIG. 6 but having only three radial fins shown in phantom.

The collated fastener unit 10 shown in FIG. 1 contains a plurality of identical fasteners 12 shown in FIG. 7. Each fastener 12 has an elongated shank 14, an elongated central core 16, five elongated radially protruding fins 18 from core 16 and an outer edge 20 on each fin 18. The fastener may have as few as three fins, as shown in FIG. 21, and as many as eleven.

Figure 8:
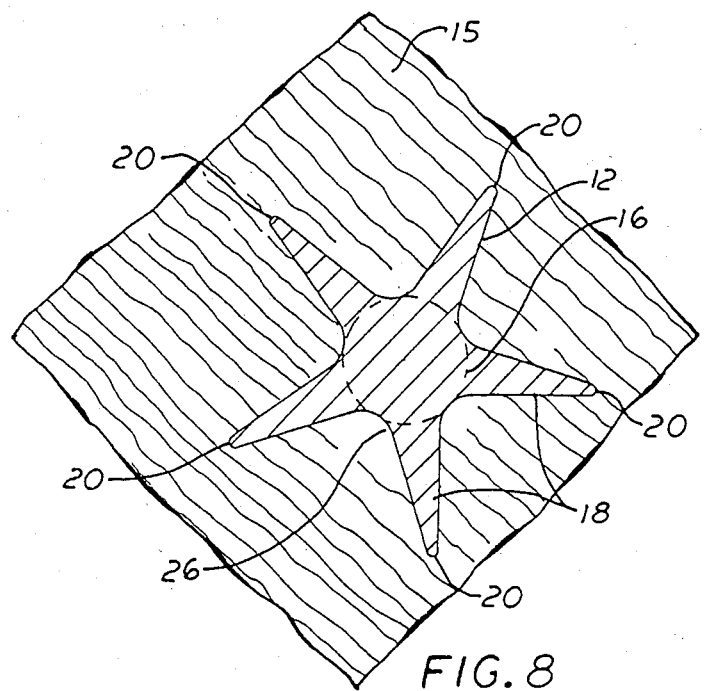
FIG. 8 is an enlarged cross-sectional view taken along line 7—7 of FIG. 7 and showing the star shaped fastener driven into wood.
Figure 9:
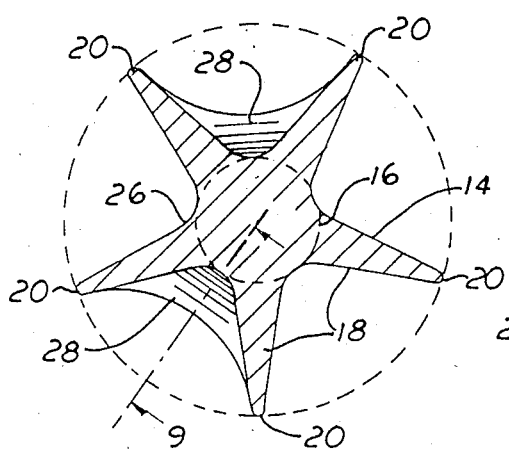
FIG. 9 is an enlarged cross-sectional view similar to FIG. 8 and depicting alternative embodiments of a fastener used in the invention.
Figure 10:
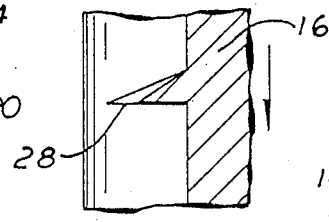
FIG. 10 is a cross-sectional view taken along line 9—9 of FIG. 9.
Figure 11:
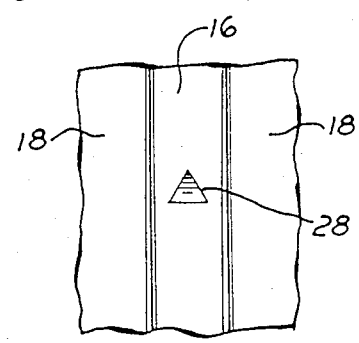
FIG. 11 is an enlarged partial side view of the fastener of FIG. 9 showing serrations in the cups.
Figure 13:
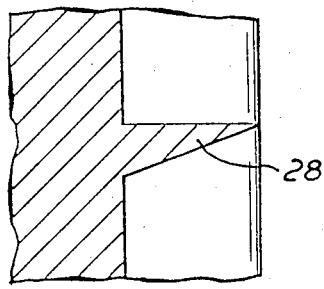
FIG. 13 is a partial cross-sectional view of the fastener of FIG. 12 taken along a plane through the shank thereof equidistant of a pair of edges.
Figure 12:
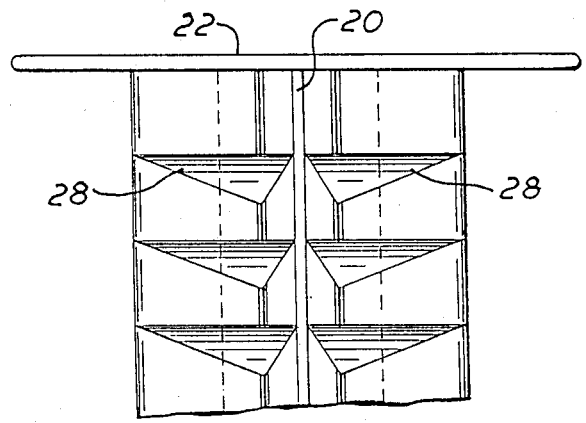
FIG. 12 is a partial side elevational view of a fastener used in the invention.

As shown in FIGS. 8 and 9, the cross-section of the shank 14 appears as star-shaped since each of the fins 18 taper from the core 16 outwardly to a rounded edge 20 at a point farthest from the core 16.

As seen in FIG. 7, a flat head 22 and point 24 of fastener 12 terminate each end of the shank 14. Shank 14 terminates at its first end 19 at the bottom 23 of head 22. The second end 21 of the shank terminates in point 24. The space between adjacent fins 18 form a cup 26 which in an alternate embodiment shown in FIG. 9 contains serrations 28 for greater holding resistance when the fastener 12 is inserted into wood 15.

Figure 15:
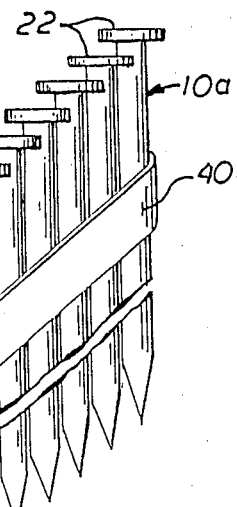
FIG. 15 is an isometric view of a collated strip of the improved common nails having an offset shank.

Head 22 contains on its rim 25 a cutout flat end dovetail slot 30, fishtail slot 32, or other form 34 or 37 depending on the desired design. Each slot is designed to capture two adjacent fins 18 on the shank 14 of the next adjacent fastener. In a common nail as seen in FIG. 15 the shank is held by the slot of the adjacent fastener because such slot surrounds the cross sectional centerline (i.e., the longitudinal axis of symmetry) of the shank.

Referring to FIG. 1, the collated fastener unit 10 is formed by the slot 30 in fastener 12a capturing two adjacent fins 18 from fastener 12b, the slot in fastener 12b capturing two adjacent fins 18 from fastener 12c and so on until the slot on fastener 12k captures the two fins on fastener 12l.

A notch 36 on each shank 14 juxtaposed to head 22 prevents the adjacent fasteners from sliding apart. However, the notch 36 is overcome by the force of an automatic hammer gun striking head 22 so that the fasteners 12 can be released in order from 12a to 12l in response to the action of the automatic hammer gun.

Figure 14:
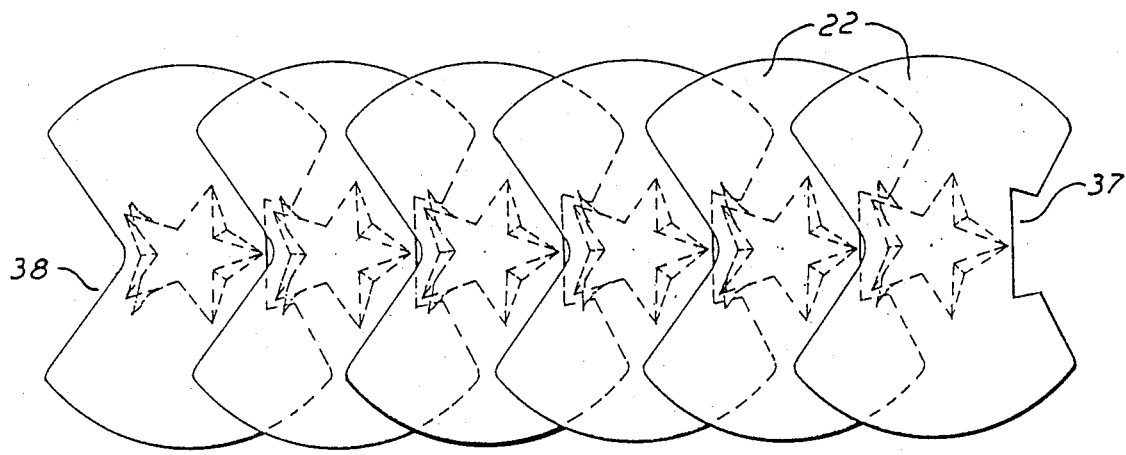
FIG. 14 is a plan view of a collated strip of roofing nails having an alternate head configuration.

Alternate designs to the head 22 are shown in FIG. 14. In this embodiment a second notch 38 is cut out of head 22 for use in providing closer spacing between shanks of a large headed fastener. This facilitates driving of the fastener over the centerline of the shank.

The collated strip 10 can contain a band 40 for ease of transportation or can be lightly glued together. However, this is not necessary for the use of the collated strip 10.

As shown in FIG. 1, the collated strip 10 containing fasteners 12a to 12l will have each end point 24 slightly above the adjacent forward facing fastener so that the bottom strip 10 will form an acute angle with a flat surface below the strip 10. The fastener at the lowest level will be struck first on its head to disengage from the collated strip.

Figure 17:
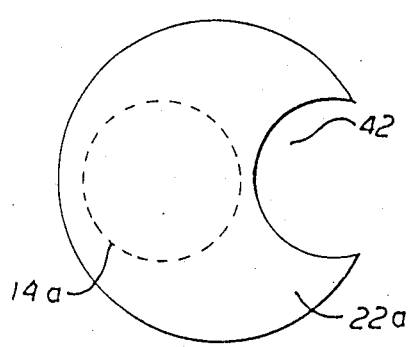
FIG. 17 is a plan view of the improved nail of FIG. 15.
Figure 18:
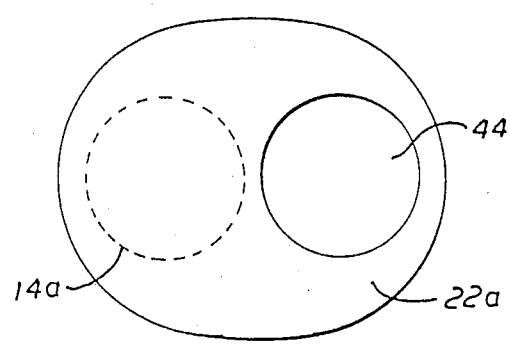
FIG. 18 is a plan view similar to FIG. 17 and showing a modification of the head thereof.

Although shank 14 is usually centered below the head 22 of each fastener as seen in FIGS. 2, 3, 6 and 14, it is not necessary to maintain such a configuration. As seen in FIG. 17, the shank 14a is offset from the center of head 22a. In like manner, shank 14a in FIG. 18 is offset from the center of head 22a. Moreover, the opening 44 can be substituted for slot 42 as an alternate fastener head configuration.

Figure 4:
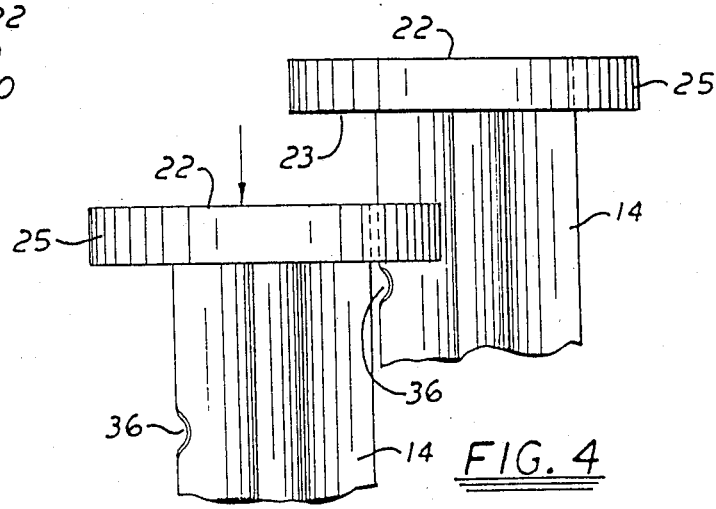
FIG. 4 is an enlarged side elevational view of a part of the strip of FIG. 1 showing the locking feature between the fasteners.
Figure 5:
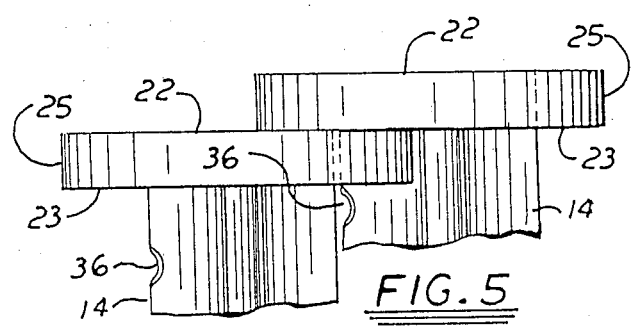
FIG. 5 is an enlarged side elevational view of fasteners showing an alternate position of the locking feature between fasteners.
Figure 2:
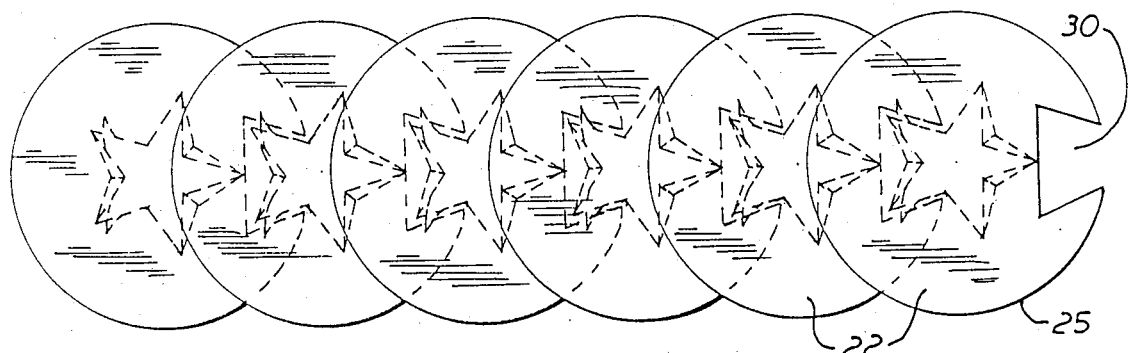
FIG. 2 is a plan view of the collated nails of FIG. 1.
Figure 3:
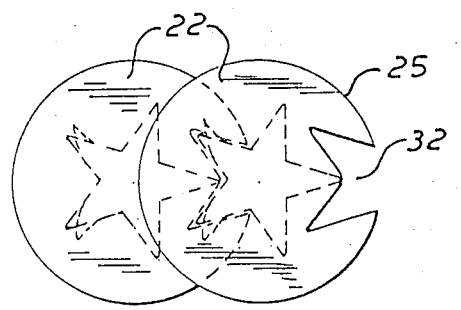
FIG. 3 is a plan view similar to FIG. 2 showing a modification of the slot in the head.
Figure 6:
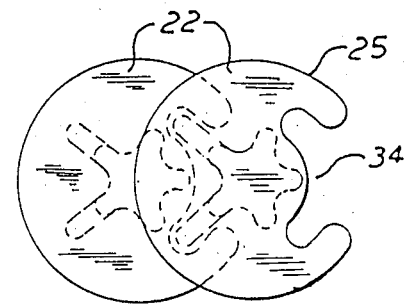
FIG. 6 is a plan view of a quick fall away nail.
Figure 16:
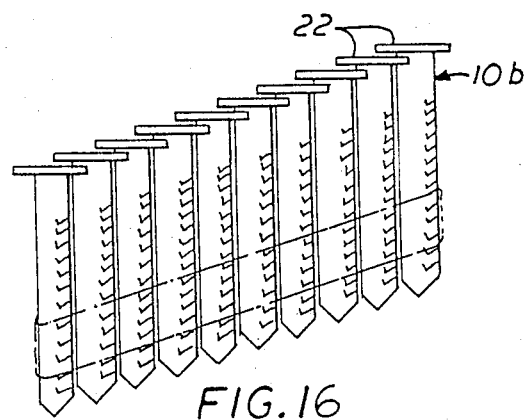
FIG. 16 is an isometric view of a collated strip of roofing nails.

As seen in FIG. 15, even common smooth shank nails can be employed in this invention as unit 10a as long as the slot enclosing the adjacent shank surrounds at least the cross sectional centerline of that shank. Roofing nails as seen in FIG. 16 also can be formed into a collated strip 10b according to this invention by forming each nail in the manner of the fastener shown in FIGS. 4 and 5.

Figure 19:
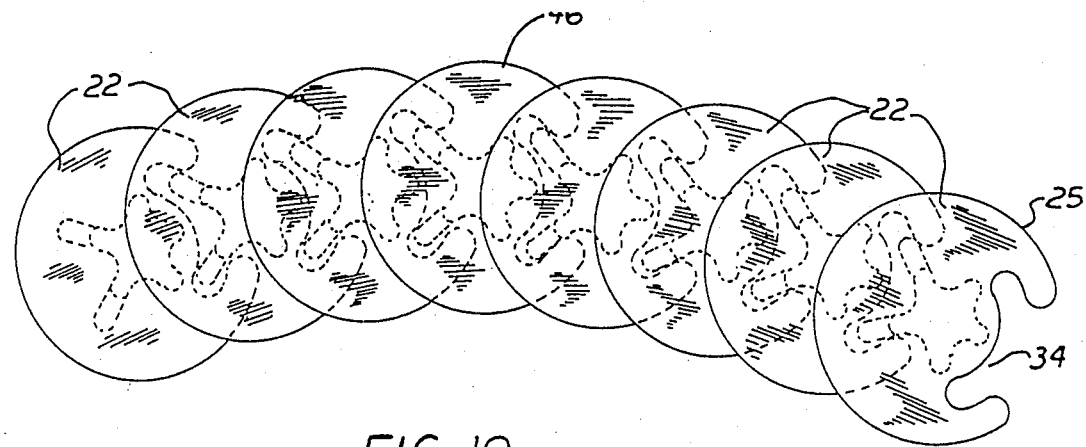
FIG. 19 is a plan view of a coil of roofing nails.

Fasteners such as roofing nails seen in FIG. 19 can form a coil 46 which can be employed in nail guns designed to handle such a configuration.

Figure 20:
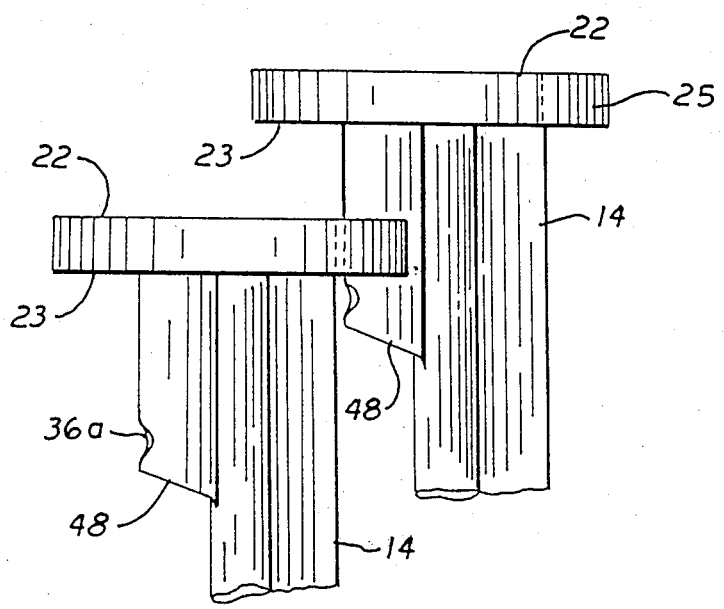
FIG. 20 is an enlarged partial side view of an alternate quick fall away notch employed with collated fasteners as also seen in FIG. 6.

A quick fall away plane 48 can be utilized in shank 14 as seen in FIG. 20 so that when the adjacent fastener is disengaged from notch 36a by the fastener hammer gun action, it easily falls away from its adjacent fastener.

Figure 22:
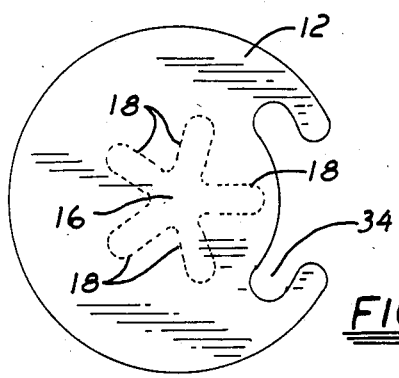
FIG. 22 is a plan view of the fastener of FIG. 6 but having five non-tapered radial fins shown in phantom.

The primary utility of the novel fasteners reside in the slot formed in the head thereof, as has been seen, i.e., the cross-sectional configuration of the shank of the nail is not controlling in that the only requirement of the invention is that the configuration of the slot or slots formed in the novel nail head be selected so as to capture an adjacent nail shank, whether the shank has a round cross-section as in conventional nails, or as in my novel star-shaped nails as shown in FIGS. 8 and 22, or a different cross-section.

For example, FIG. 22 depicts an improved star nail having uniform width (non-tapered) fins, a smaller central core than the nail of FIG. 8, having a 72 degree angle between adjacent fins (as distinguished from the approximately 98 degree fin included angle of the nail of FIG. 8), and having a substantially greater surface area than the nail of FIG. 8 or any prior art nail.

Thus, it should be clear that the improved nail of FIG. 22 may also be provided in collated form in accordance with the teachings of this invention.

An imaginary circle coincident with the radially outermost edges 20 of the fins 18 of the FIG. 8 nail has a diameter about three times greater than the diameter of central core 16; a similar imaginary circle (FIG. 22) has a diameter about four times greater than the diameter of the central core shown in FIG. 22. The central core of FIG. 22 is reduced in diameter relative to core 16 of the FIG. 8 shank, and the material saved by such core reduction is added to the FIG. 22 fins to increase their radial extent. Although the FIG. 8 nail has a surface area 17% greater than the surface area of a common round shank nail, the FIG. 22 nail has an even more impressive surface area—a surface area 86% greater than that of a round shank nail.

The width of the uniform-width fins of FIG. 22 is equal to about ⅓ the diameter of the central core of the FIG. 22 fastener.

The FIG. 8 and FIG. 22 nail shanks require but half the material needed to make a round shank nail, yet have a tensile strength more than double the tensile strength of a common round shank nail.

Also worthy of note is the concave bight formed where contiguous fins join the central core of the FIG. 8 and FIG. 22 fasteners, which concavities are a result of the cold working method employed in making the shanks of the novel fasteners depicted herein.

The adaptability of the novel fastener to the latest development in nails (FIGS. 8 and 22) illustrates the flexibility of the invention and establishes the fact that this invention has no significant limitations.

It will thus be seen that the objects set forth above, and those made apparent from the foregoing description, are efficiently attained and since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall there between.

Now that the invention has been described,

What is claimed is:

1. A plurality of fasteners collated together in a strip in a side by side relationship for use in a fastener tool, each fastener comprising:

(a) an elongated shank having a flat head at a first end and a point at a second end, (b) an annular edge circumscribing the flat head with at least one cut out slot on the edge, and (c) the slot being of a depth and width sufficient to capture the shank of an adjacent fastener to prevent the adjacent fastener from disengaging from its side by side relationship until a force is exerted on the head of a fastener positioned at a lowest level in the collated strip.

2. The collated fasteners according to claim 1 wherein a notch on the shank is juxtaposed to the head to engage a back portion of the slot on an adjacent fastener and prevent the fastener from sliding with respect to its adjacent fastener.

3. The collated fasteners according to claim 1 wherein the shank of each fastener is centered in a bottom of the flat head.

4. The collated fasteners according to claim 1 wherein the shank of each fastener is offset from the center in a bottom of the flat head.

5. The collated fasteners according to claim 1 wherein there is one cut out slot on the edge of each head in the form of a dovetail.

6. The collated fasteners according to claim 1 wherein there is one cut out slot on the edge of each head in the form of a fishtail.

7. A plurality of fasteners collated together in a side by side relationship for use in a fastener tool, each fastener comprising:

(a) an elongated shank having a flat head at a first end and a point at a second end and between the first and second end an elongated central core having at least three radial fins tapering outwardly from the core to an outer rounded edge, (b) an annular edge circumscribing the flat head with at least one cut out slot on the edge, (c) two adjacent fins captured by the slot in the head of an adjacent fastener in the collated side by side relationship.

8. A collated fastener according to claim 7 wherein there are five radial fins tapering outwardly from the core on each fastener.

9. A collated fastener according to claim 8 wherein there is a notch juxtaposed to the head on the two adjacent fins of each fastener captured by the slot in the head of an adjacent fastener.

10. The collated fasteners according to claim 7 wherein the shank is centered in a bottom of the flat head of each fastener.

11. The collated fasteners according to claim 7 wherein the shank is offset from the center in a bottom of the flat head of each fastener.

12. The collated fasteners according to claim 7 wherein a space between two adjacent radial fins on each fastener form a cup and a bottom of the cup contains at least one serration.

13. The collated fasteners according to claim 9 wherein there is one cut out slot on the edge of each head in the form of a dovetail.

14. The collated fasteners according to claim 9 wherein there is one cut out slot on the edge of each head in the form of a fishtail.

15. The collated fasteners according to claim 7 wherein the fasteners are roofing nails.

16. The collated roofing nails according to claim 15 wherein there is one cut out slot in the edge of each head in the form of a dovetail.

17. The collated roofing nails according to claim 15 wherein there is one cut out slot in the edge of each head in the form of a fishtail.

18. The collated roofing nails according to claim 15 wherein there are two cut out slots on the edge of each head.

19. The collated fasteners according to claim 9 wherein the shank has an angled fall away plane below each notch.

20. A plurality of fasteners collated together in a side by side relationship for use in a fastener tool, each fastener comprising:

(a) an elongated shank, star shaped in cross section, having a flat head at a first end and a point at a second end with the star having five outer edges, (b) an annular edge circumscribing the flat head with at least one cut out slot on the annular edge, (c) two adjacent outer edges in the star captured by the slot in the head of an adjacent fastener in the side by side relationship.

21. The collated fasteners according to claim 20 wherein the shank is centered in a bottom of the flat head in each fastener.

22. The collated fasteners according to claim 20 wherein the shank is offset with respect to the center in a bottom of the flat head in each fastener.

23. The collated fasteners according to claim 20 wherein there is one cut out slot in the edge of each head in the form of a dovetail.

24. The collated fasteners according to claim 20 wherein there is one cut out slot on the edge of each head in the form of a fishtail.

25. The collated fasteners according to claim 20 wherein the fasteners are large headed nails.

26. The collated large headed nails according to claim 25 wherein there is one cut out slot on the edge of each head in the form of a dovetail.

27. The collated large headed nails according to claim 25 wherein there is one cut out slot on the edge of each head in the form of a fishtail.

28. The collated large headed nails according to claim 25 wherein there are two cut out slots on the edge of each head.

29. The collated fasteners according to claim 20 wherein said outer edges are the radially outermost edges of five equidistantly and circumferentially spaced fins, wherein a common fin-included angle is defined by contiguous pairs of fins, and wherein an imaginary circle coincident with the radially outermost edges of said fins has a diameter about three times greater than the diameter of a central core of said shank.

30. The collated fasteners according to claim 29 wherein an elongate, concave bight is formed where each pair of contiguous fins joins said central core.

31. The collated fasteners according to claim 30 wherein the quantity of material used to form said fasteners and the weight thereof is about one-half that of a cylindrical shank nail having a diameter equal to said fin diameter.

32. The collated fasteners according to claim 31 wherein said fin-included angle is about 98 degrees.

33. The collated fasteners according to claim 32 wherein said fins are tapered.

34. The collated fasteners according to claim 20 wherein said outer edges are the radially outermost edges of five equidistantly and circumferentially spaced fins, wherein a common fin-included angle is defined by contiguous pairs of fins, and wherein an imaginary circle coincident with the radially outermost edges of said fins has a diameter four times greater than the diameter of a central core of said shank.

35. The collated fasteners according to claim 34 wherein an elongate concave bight is formed where each pair of contiguous fins joins said central core.

36. The collated fastener according to claim 35 wherein the quantity of material used to form said fasteners and the weight thereof is about one-half that of a cylindrical shank nail having a diameter equal to said fin diameter.

37. The collated fastener according to claim 36 wherein said fin-included angle is about 72 degrees.

38. The collated fastener according to claim 37 wherein said fins are of uniform width.

39. The collated fasteners of claim 38, wherein said fins have a width about one-half the diameter of said central core.

* * * * *